Dec. 10, 1957  G. M. McMULLIN  2,815,911
AUTOMATIC TAXIMETER CONTROL DEVICE
Filed June 9, 1954  3 Sheets-Sheet 1
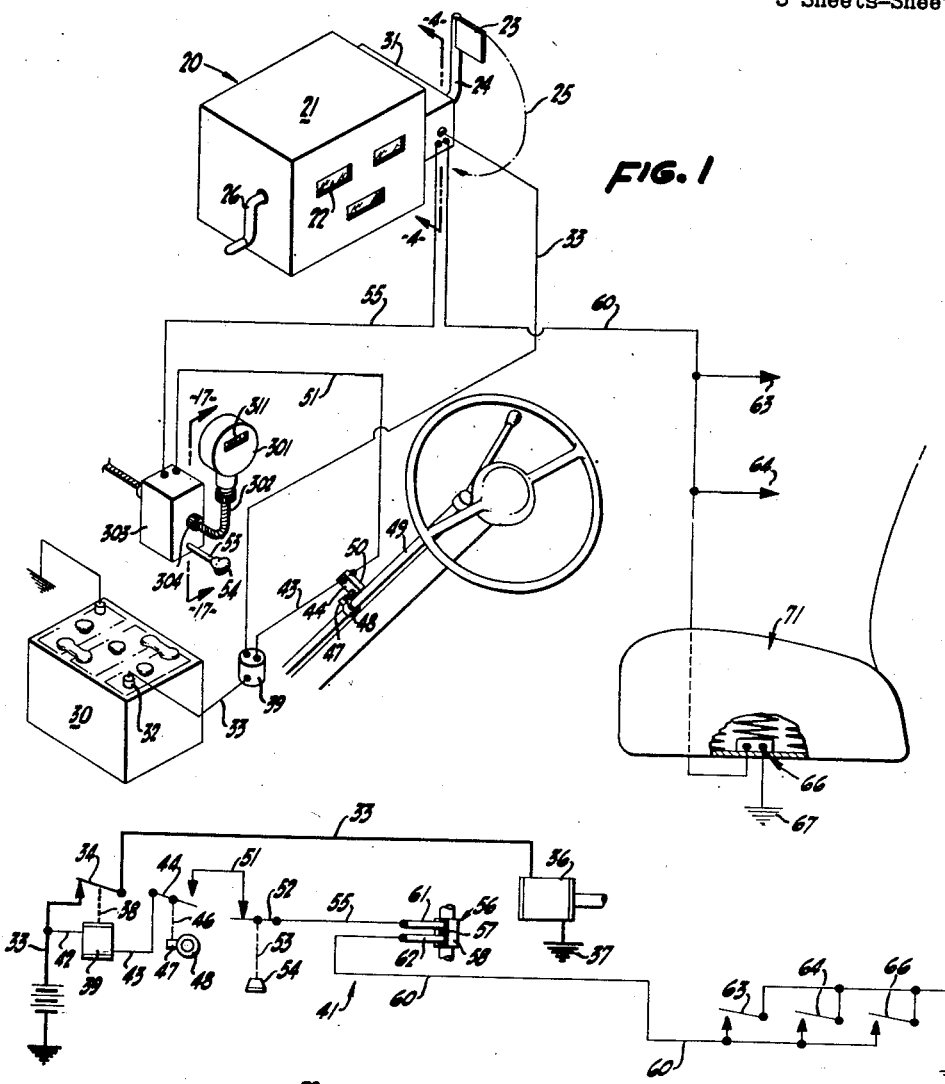
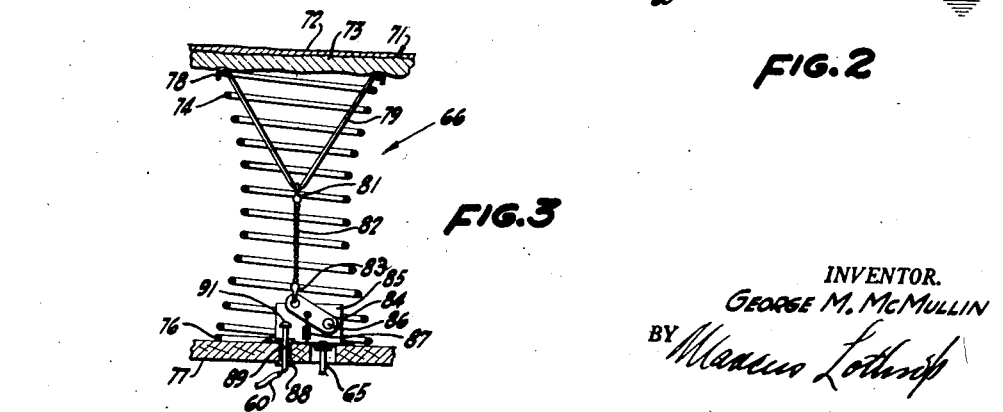
INVENTOR.
GEORGE M. McMULLIN
BY
ATTORNEY

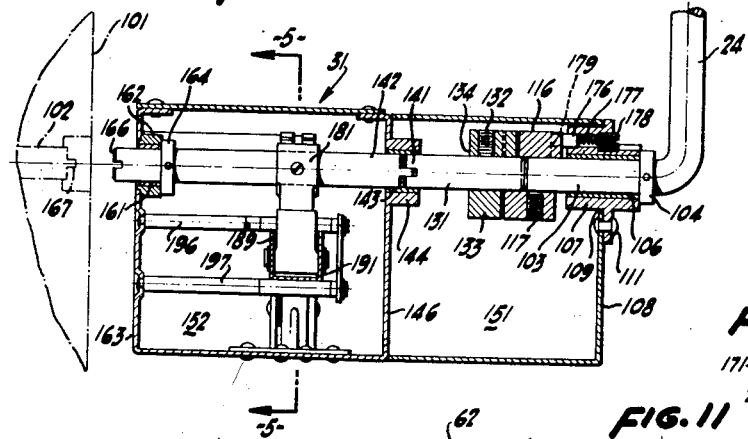

Dec. 10, 1957  G. M. McMULLIN  2,815,911
AUTOMATIC TAXIMETER CONTROL DEVICE
Filed June 9, 1954  3 Sheets-Sheet 3
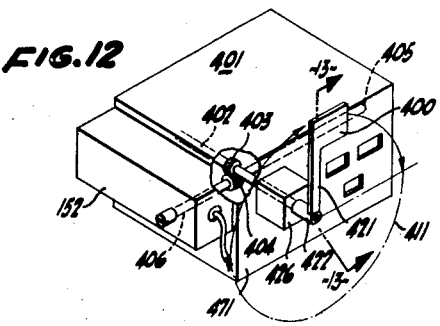
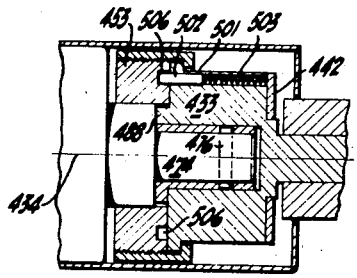
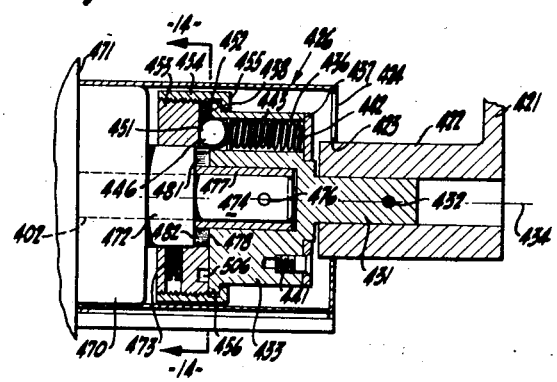
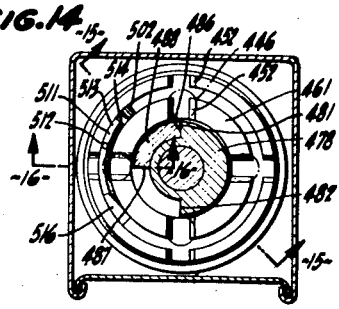
INVENTOR.
GEORGE M. McMULLIN
BY
ATTORNEY United States Patent Office 2,815,911
Patented Dec. 10, 1957

2,815,911

AUTOMATIC TAXIMETER CONTROL DEVICE

George M. McMullin, Broderick, Calif., assignor to Automatic Devices Co., Inc., a corporation Application June 9, 1954, Serial No. 435,578

3 Claims. (Cl. 235—30)

My invention relates to taximeter control devices and particularly to taximeter control devices which place a taximeter in operating condition independently of manual operation of the meter by the taxicab driver.

The customary taximeter is put into operating status by rotation of a metal flag on a shaft, the operation being manually performed by the taxicab driver. When the meter is placed in operating position by the driver the internal mechanism of the meter commences to record the fare, the amount of the fare being shown by appropriate indicia on the meter. It is frequently found, however, by operators of taxicab companies that despite rules and company regulations to the contrary taxicab drivers sometimes inadvertently fail to place the meter in operating condition; or, once having placed it in operating condition, thereafter surreptitiously render the meter inoperative by returning the flag and connected meter to a "no-fare" position, relying upon the ignorance or inattentiveness of the passenger to avoid discovery. With the meter in an inoperative status, no record of the fare appears; the driver is then able to charge whatever he thinks the passenger will be willing to pay and the driver can pocket the fare paid. This procedure is known in the trade as "high flagging," the term being derived from the fact that the flag is either kept in or returned by the driver to its up or high position which corresponds to a non-operating status of the meter. Numerous attempts have been made by taxicab companies to overcome "high flagging" including the installation of odometers to be checked by the company in conjunction with the cumulative fare recorders in the taxicab meters; but an odometer, while it shows the total mileage travelled by the cab, does not give an effective cross-check against the total mileage chargeable on a meter basis and therefore accountable to the company. The reason for the ineffectiveness of this check is that taxicab drivers must frequently cruise for extended and varying distances in search of passengers or "fares," the non-metered cruising mileage accumulating on the odometer and beclouding the mileage situation so far as accountable or meter mileage is concerned.

It is therefore an object of my invention to provide a taximeter control device which is effective to place the meter in operating or recording condition whether or not the cab driver rotates his flag shaft into normal meter starting and operating position.

It is another object of my invention to provide an automatic taxi control device which is effective to start the operation of the taximeter upon the concurrence of the events of a passenger sitting in one of the taxicab seats and the taxicab driver's placing his cab in gear.

It is still another object of my invention to provide a taximeter control device which automatically renders the meter operative and which cannot be rendered inoperative by the cab driver until the passenger leaves his location on the seat of the cab.

Still another object of the invention is to provide a taximeter control device which is simple and inexpensive to manufacture, install and maintain and which can be used on existing meter equipment.

Yet another object is to provide a generally improved automatic taximeter control.

Other objects, together with the foregoing, are obtained in the embodiment described in the following description and shown in the accompanying drawings, in which:

Figure 1 is a schematic showing of the device and its general layout in a taxicab installation.

Figure 2 is a wiring diagram of the electrical circuits and switches included in the device.

Figure 3 is a section on a generally median vertical plane through one of the seat switches.

Figure 4 is a transverse vertical section on the plane generally indicated by the line 4—4 of Figure 1, the plane including the axis of the meter actuating shaft.

Figure 5 is a longitudinal vertical section taken along the plane indicated by the line 5—5 of Figure 4.

Figure 6 is an exploded perspective view to an enlarged scale, of a portion of the clutch mechanism on the adjacent ends of flag and adapter shafts, the clutch mechanism appearing in section in Figure 4.

Figure 7 is a perspective view, to an enlarged scale, of a portion of the cut-out or deactivating switch.

Figure 8 is a semi-diagrammatic view showing the relative position of the flag shaft, the clutch mechanism and the meter-actuating shaft in prior to starting position of the control device.

Figure 9 is a view similar to Figure 8 but showing the flag shaft rotated counter-clockwise ninety degrees by manual operation.

Figure 10 is a view similar to Figure 9 but showing the relative position of the parts after the flag shaft has been rotated upwardly to a vertical position.

Figure 11 is a view similar to Figure 8 but showing the operation of the clutch mechanism and meter-actuating shaft resulting from the automatic operation of the solenoid.

Figure 12 is a perspective of a modified form of automatic control device mounted on a commonly encountered meter but of a kind differing from the meter illustrated in Figure 1.

Figure 13 is a section of the flag shaft mechanism taken along the plane generally indicated by the line 13—13 of Figure 12.

Figure 14 is a section on the plane indicated by line 14—14 of Figure 13.

Figure 15 is a section along the plane indicated by the line 15—15 of Figure 14.

Figure 16 is a section taken along the plane indicated by the line 16—16 of Figure 14.

Figure 17 is a section along a median vertical plane of the odometer clutch and indicated by the line 17—17 of Figure 1.

Figure 18 is a top view of the odometer clutch teeth mechanism taken along the plane indicated by the line 18—18 of Figure 17, a portion of the figure being broken away to reduce its extent.

Figure 19 is an end view in section of the odometer clutch mechanism, the view being taken along the plane generally indicated by the line 19—19 of Figure 17.

A taximeter 20 customarily comprises a box-shaped frame 21 having suitable windows 22 therein on the side facing the rear seat of the taxicab to permit the customer to view the amount of his fare as it accumulates, the meter being rendered operative by suitable rotation of a flag 23 mounted on a vertically disposed rotatable flag shaft 24, the rotation of the flag, for example, being in a clockwise direction as shown in Figure 1. In the case of most meters, rotation of the flag shaft through fifteen to thirty degrees is sufficient to start the meter operating; but not infrequently the flag is made rotatable through 180 degrees or to a vertically upward and downward position, through an arc as indicated by the arrow 25. At the conclusion of the ride, in the particular meter shown in Figure 1, the flag is rotated counter-clockwise through 180 degrees and the meter stopped and reset to starting position by appropriate rotation of a crank handle 26 projecting outwardly from the end of the meter opposite from the flag and acting through interior mechanism (not shown) in the meter. The relative positions of the flag shaft and the crank on the meter box vary according to the particular meter employed but Figure 1 shows a widely used flag and crank location.

One form of the automatic taximeter control device of my invention is particularly suitable for use with the common type of meter shown in Figure 1 and the mechanical portions as well as some of the electrical parts of my meter control are housed in a box 31 or frame or housing appropriately mounted on the flag-shaft side of the meter box 21, the housing 31 being generally elongated in shape and compatible in size with the dimensions of the meter itself. While the automatic taximeter control device of my invention permits of the customary manual operation in a fashion very similar to that utilized in a meter not having my control device installed, a particularly novel feature of my invention resides in the overriding electro-mechanical mechanism which places the meter in operation despite the failure of the cab driver to "down-flag."

An electrical energy source 31, such as a motor vehicle storage battery appropriately grounded, provides a suitable voltage potential at a terminal 32. A heavy electrical cable conductor 33 or cable fastened to the terminal 32 leads to a normally open switch 34, thence to a solenoid 36 and passes through the solenoid windings to an appropriate ground 37, as for example, the frame of the vehicle. The heavy cable or conducting wire 33 allows a large current to pass therethrough and thus furnishes a substantial energy to the solenoid 36 when the switch 34 is closed. The switch 34 is closed by a mechanical linkage 38 which, along with the switch 34, is included in a relay 39, the relay being actuated upon the closure of switches in a combined series-parallel circuit, generally designated 41. The circuit 41 derives its energy from a tap wire 42 connected to and leading from the large cable 33, the tap 42 passing through the relay 39 and serving to energize the relay in order to translate the linkage 38 and close the switch 34. From the other side of the relay 39 a conductor, 43 leads to one side of a switch 44 in open position prior to starting, the switch 44 being closed by appropriate motion of a linkage 46 actuated by rotation of a suitable projection 47 extending outwardly from a collar 48 mounted on the shaft 49 of a gear shift lever of the customary type, the placing of the car in gear being effective to rotate the dog 47 into contact with a switch button 50 which in turn actuates the linkage 46 so as to close the switch 44. Conveniently, the switch can be of the double acting type mercury switch effective to close the circuit in any position of the gear-shift lever except neutral. It is clearly to be recognized that the switch 44 can be closed by any suitable mechanism in place of the gear shift lever structure described; for example, a governor whose rotation is dependent on car motion, or suitable structure used in conjunction with automatic transmissions is equally suitable for this purpose. From the gear shift switch 44 an electrical conductor 51 leads to one side of an odometer switch 52 in normally closed position, the opening of the odometer switch being effected by translation of a linkage 53 or rod resulting from appropriate manipulation of an odometer switch button 54. From the other side of the odometer switch 52 a line 55 leads upwardly to the interior of the box 31 which contains not only the solenoid 36 but also a cut-out switch 56, the cut-out switch having a conducting portion 57 covering slightly less than 60 degrees of peripheral arc and a non-conducting collar 58, the conducting portion 57 being in the position shown in Figures 2 and 7 for prior to starting position of the meter. In contact with the conducting portion 57 and forming the terminal of the line 55 leading from the odometer switch 52 is an inlet 61; and leading outwardly from the conducting sector 57 is an outlet contact 62 connected to a line 60 leading to a first seat switch 63, a second seat switch 64 and a third seat switch 66 located conveniently under the seats of the car and preferably having at least two of these switches under the rear seat of the car and one of the switches under the front seat of the car so that regardless of the seat chosen by the passenger at least one of the passenger seat operated switches will be closed. It is to be noted that the seat-operated switches 63, 64 and 66 are placed in parallel electrical arrangement so that the closing of any one of the switches will be adequate to complete the circuit and permit electrical energy to run through the entire circuit from the take off line 42 from the cable 33 through the various switches and to flow through a line 65 into the ground 67, conveniently the car frame.

Figure 1 illustrates a typical seat switch installation, a portion of a seat 71 being cut away to show the general layout of one of the seat spring switches, for example, switch 66 shown to an enlarged scale in Figure 3. The seat 71 comprises, in part, a top leather covering 72 underlaid by padding 73 supported by a spring of the helical box type 74. The bottom coil 76 of the spring rests on a suitable support 77 such as wooden planking and extends upwardly, its top coil 78 supporting the seat covering and cushioning in its normally upward position. Depending from the top coil 78 of the spring is a V-shaped member 79, such as wire, having mounted on its lower apex a fastening 81 from which depends a flexible chain 82 the chain terminating at its lower end in a fastening 83 hooked to the outer end of a metallic arm 84 pivotally mounted on a metallic support plate 85 by a pin 86 and urged normally downward by a spring 87. Projecting upwardly through an aperture 87 in the wooden framework 77 and appropriately insulated therefrom as by a non-conducting sleeve 88, is a switch contact pin 89 having a button 91 at the upper end thereof and connected at its lower end to the electrical conductor 60 in the circuit 41. As the passenger sits on the seat, his weight depresses the helical spring, overcoming the upward force normally exerted by the spring. As the spring is depressed, the switch spring 87 pulling downwardly on the lever arm 84 about the pivot 86 forces the outer free end of the lever arm 84 to contact the switch button 91 and allowing current to run from the conductor 60 through the pin 89, through the lever arm 84 and outwardly through the pivot 86 mounted in the metallic plate 85 and thence downwardly through the metallic bottom of the plate 85 and outwardly through the wire 65 to the ground, thus completing the circuit of the seat switch.

When the box 31 containing the electrical and mechanical portions of the control device of my invention is to be installed on an existing meter of the type illustrated in Figure 1, the flag shaft 24 is removed from its customary location immediately adjacent the vertical edge 101 of the meter shown in outline in Figure 4, the shaft 24 being theretofore secured by appropriate fastenings to the meter shaft 102. The box 31 is then interposed between the meter wall 101 and the flag shaft 24 secured to a flag stub shaft 103 as by a collar fastening 104. The stub shaft 103 is rotatably disposed in a bearing 106 placed within flange 107 mounted on the outermost edge 108 of the box 31, the flange protruding through an aperture 109 in the wall 108 and being secured to the wall 108 by suitable fastenings 111.

Adjacent the inner end of the flag stub shaft 103 is a clutch 116 appearing in section in Figure 4, and in perspective and to an enlarged scale in Figure 6, the clutch 116 being secured to the shaft 103 by a fastener, such as a set screw 117. The clutch 116 is generally right circular cylindrical in shape and has a cylindrical aperture 119 bored therethrough substantially symmetrical about an axis 121, the flag shaft 103 fitting within the aperture 119. The outermost end of the clutch 116 is shaped to form a helical surface 122, the outermost end of the surface commencing, as appears in Figure 6, at a vertical radially disposed line 123 or corner and proceeding rearwardly in a helical fashion, terminating at a corresponding line or corner 124 spaced inwardly from the line 123, a vertical planar face 125 being formed between the two lines or corners 123 and 124. At the opposite or inner end of the clutch 116 I provide a boss 127 projecting inwardly, the boss forming one half of an annular ring in end view, and in the position shown in Figure 6 the two ends of the annular ring form radially disposed vertical faces 128 and 129.

Mounted on an adapter shaft 131 (having its outer end in abutment with the inner end of the stub shaft 103) and fastened to the adapter shaft 131, as by set screws 132, is a flange 133 planar at its inner end 134 but having at its outer end adjacent the clutch 116 a projection 136 or boss. As shown in Figure 6 the boss 136 has a radially vertical wall 137 and a second radial wall 138 subtending at the axis 121 an angle with respect to the face 137, such as approximately 60 degrees.

The inner end 141 of the adapter shaft 131 has suitable configurations such as a slot therein to match with corresponding configurations such as a tongue in the outer end of a meter actuating shaft 142, the interlocking portions of the shafts being supported by a suitable bearing 143 held in a boss 144 formed in a vertical wall 146 substantially dividing the box 31 longitudinally into two parts. As appears most clearly in Figure 4, the vertical wall 146 forms a dividing line in the box 31 between a right-hand box portion 151 and a left-hand box portion 152, the box portion 151 being demountably connected to the box portion 152 to permit the box portion 152 and its attendant enclosed mechanism to be used not only on the type of meter illustrated in Figure 1 but also on the different kind of meter shown in Figure 12. While the box portion 151 is ordinarily used only on the general type of meter illustrated in Figure 1, the universal application of the box portion 152 and its attendant mechanism, however, lends itself to economies in manufacture owing to mass production of that portion.

As most clearly appears in Figure 4, the meter actuating shaft 142 is supported at its left-hand end by suitable bearing 161 supported in a bushing 162 mounted on the left-hand edge wall 163 of the box 152. A collar 164 mounted on the meter actuating shaft prevents endwise translation of the meter actuating shaft and the innermost end 166 of the meter actuating shaft is suitably conformed to mate with corresponding configurations 167 on the meter drive shaft 102 shown in outline in Figure 4.

With particular reference to Figures 4, 6 and 8, it will be seen that as the flag shaft 24 is rotated in a counterclockwise direction, as appears in Figure 8, the stub shaft 103, the adapter shaft 131, the meter actuating shaft 142, and the meter drive shaft 102 will be accordingly rotated and if rotation is carried to sufficient extent, such as 15 to 30 degrees depending upon the particular meter, the internal mechanism of the meter will be actuated and the meter will commence to run. As the flag shaft is rotated counterclockwise the upper face 128 on the inner end of the clutch 116 or clutch mechanism, being in abutment with the face 137 on the flange 136, will correspondingly rotate the flange 136 counterclockwise and since the flange is mounted on the adapter shaft 131 the adapter shaft and, in turn, the meter-actuating shaft 142 and meter shaft 102, will accordingly be rotated to a similar extent so as to start the meter. As appears most clearly in Figure 9, where the clutch mechanism has been rotated counterclockwise 90 degrees by manual operation of the flag shaft, and as indicated by the arrow 171, the projection 127 and the boss 136 will assume the positions shown, the abutting faces 128 and 137 then being in a horizontal attitude. Since a 90 degree counterclockwise rotation of the flag shaft and the corresponding 90 degree counterclockwise rotation of the meter actuating shaft is more than sufficient to place the meter in operation, there is no particular need for rotating the flag shaft beyond the 90 degree point although some meters permit rotation to 180 degrees. No difference in result is effected, however, in the control device by rotating the flag shaft through 90 degrees rather than through 180 degrees, and for purposes of illustration and as shown in Figures 8, 9 and 10, the flag shaft will be considered here to have been rotated through 90 degrees only. With the mechanism shown in the 90 degree displaced position indicated in Figure 9, it will be clear that an attempt by the cab driver to render the meter inoperative by returning the flag shaft to its uppermost or vertical position will be ineffective to stop the running of the meter. The reason for this is that the boss 136 on the flange 135 is of an arcuate extent substantially less than the 180 degree arc obtaining between the faces 128 and 129 of the clutch 116. Thus, as appears in Figure 10, even though the flag shaft 24 is rotated clockwise by the cab driver through 90 degrees back to its original vertical position, no change in the position of the boss 136 is effected. And since the boss 136 and the adapter shaft 131 on which it is mounted remain in their original position, the meter continues to run and the returning of the flag shaft 24 to the "high flagging" position is ineffective to change the status of the meter. The meter continues to run regardless of the action of the cab driver in returning the flag shaft to up position. The cab driver is unable to rotate the flag shaft clockwise to a position beyond the uppermost position shown in Figure 10 so as to rotate the boss 136 to its original position since a positive stop is provided. As appears most clearly in Figures 4 and 6, a pin 176 is urged inwardly by a spring 177 confined by a screw head 178, the innermost end 179 of the pin bearing at all times against the helical face 122 on the outer end of the clutch. As shown in Figure 6, with the clutch 116 in a position corresponding to a vertical attitude of the flag shaft the vertical radial face 125 of the clutch 116 bears against the adjacent side of the pin 176 and is thereby prevented from being rotated counterclockwise beyond the position of abutment with the pin. I therefore provide a lost motion mechanism and a position stop effectively preventing a cab driver from rendering the meter inoperative once the meter has been started.

I also provide mechanism for starting the running of the meter even though the cab driver negligently fails or willfully chooses not to start the running of the meter by rotation of the flag. With particular reference to the left-hand box portion 152 of Figure 4 and the longitudinal section in Figure 5, there is mounted on the meter actuating shaft 142 the non-conducting collar 58 having projecting downwardly therefrom a finger 182. Disposed below the meter actuating shaft 142 and slightly to the left-hand side thereof, as appears most clearly in Figure 5, is a dog member 183 having a first upwardly projecting finger 184 having a substantially vertical right-hand face 186 and a second horizontally projecting finger 187, the dog member 183 being rockably mounted about a pivot pin 188 disposed between and supported by a pair of opposite walls 189 of an elongated channel member 191 or plunger. Directly below the horizontal finger 187, the bottom of the channel 191 has a cut-out and depressed portion 192 supporting a spring 193 which bears at its upper end against the finger 187 and urges the finger 187 and the dog 183 upwardly. The finger 187 is prevented from being raised to a position above the horizontal by a suitable pin 194 bearing against the back side of the dog member 183. The plunger 191 is elongated and assumes a substantially horizontal position, being free to translate horizontally between a pair of upper rollers 196 and lower supporting rollers 197.

A spring 201 is disposed in a horizontal position and secured at its right-hand end, as shown in Figure 5, to an upstanding member 202 fastened to the box frame and secured at the other end to a spur 203 upstanding from the translatable plunger 191, the spring urging the channel 191 or plunger in a left-hand direction, as appears in Figure 5. At the right-hand end 206 of the plunger 191 there is removably mounted a linkage 207 having a pair of outspreading arm stops 208, and terminating at its extreme right end in an armature 209 preferably of iron or equivalent magnetic core material. The right-hand end of the armature 209 terminates at the left-hand opening of an aperture 211 in the solenoid 36 of the usual kind, the solenoid 36 having the customary windings 213 energized by the current entering through the heavy conductor 33.

Upon energization of the line 33, the corresponding energization of the solenoid coils effects translation of the armature 209 into the aperture 211. The magnetic field built up in and exerted by the solenoid on the armature 209 overcomes the opposing spring force urging the plunger toward the left, and quickly pulls the armature into its right-hand or closed position wherein abutment of the outspreading wings 208 against the adjacent walls of the solenoid halts further advance of the plunger. It is to be clearly understood that any appropriate mechanism can be used to effect the translation of the plunger in lieu of a solenoid; these mechanisms including motors of the back-geared type as well as hydraulic and vacuum type actuators. The right-hand direction of translation of the plunger effects a corresponding translation of the upstanding dog 183, the leading edge 186 of which thereupon comes into abutment with the depending finger 182 and rotates the finger 182 and the meter actuating shaft 142 in a corresponding and counterclockwise direction. The dimensions of the parts are so proportioned as to rotate the finger 182 from the position shown in full in Figure 5 to the position approximately as shown in outline and indicated by the reference numeral 221. The rotation so effected, approximately 60 degrees, is sufficient to start the running of the meter. Thus, despite the failure of the cab driver manually to rotate his flag shaft the meter is set into operating condition as soon as the passenger takes his seat in the vehicle and the gear shift lever moved out of neutral position.

The rotation of the depending finger 182 not only effects a corresponding rotation of the meter actuating shaft but also rotates counterclockwise the conducting sector 57 on the uppermost portion of the collar 58 from which the finger 182 depends. The sector 57 is a conductor, thereby permitting a continuous flow of current between the contact 61 and the contact 62 so long as those contacts are in engagement with the conducting sector 57. When, however, rotation of the sector 57 has been effected by translation of the plunger and the contacts 61 and 62 have come into engagement with the non-conducting portion 58 of the collar, current ceases to flow between the contacts 61 and 62. As will be seen most clearly in the wiring diagram in Figure 2, when the circuit 41 is open at any point, current no longer acts upon the mechanism of the relay 39 and as a result the linkage 38 is translated upwardly, opening the switch 34 in the heavy cable 33 leading from the battery to the solenoid. Upon opening of the circuit leading into the solenoid, the magnetic field surrounding the plunger armature 209 collapses and the spring 201 is again allowed to urge the plunger 191 toward the left, as appears in Figure 5. As the plunger travels in a left-hand direction, it carries with it the dog member 183, and returns the dog 183 to its starting position. It is to be noted that if at this juncture the cab driver were to try to stop and reset the meter to starting position by manipulation of the crank 26, resetting of the meter would concurrently rotate the meter actuating shaft 142 and the collar 58 in a clockwise direction. This rotation would again bring the contacts 61 and 62 onto the conducting portion 57, thus completing the circuit and causing the solenoid immediately to become energized and thus reactivate the meter.

Any convenient degree of rotation of the meter shaft may be made so long as the rotation is sufficient to set the meter into running condition; meters are usually rendered operative by shaft rotations of approximately 30 degrees or even less. It has been found convenient to make the throw of the finger 182 and rotation of the meter actuating shaft 142 about 60 degrees, and as most clearly appears in Figure 11 at the conclusion of the solenoid-actuated rotation of the meter actuating shaft, the boss 136 on the outer end of the flange 135 is in approximately the position shown. It is to be noted that even though the flag shaft 24 has not been rotated by the driver and therefore remains vertical, still the sector 136 and meter actuating shaft 142 have been rotated into a position sufficient to start operation of the meter. Upon arrival of the cab at its destination and the departure of the "fare" or passenger, the seat switch lifts, and the circuit 41 thereby is opened. At this point the meter is stopped and reset to prior to starting position by appropriate rotation of the crank handle 26 in the type of meter shown in Figure 1. The effect of rotation of the crank is to turn the meter actuating shaft in a clockwise direction and whether the boss 136 is in the position shown in Figure 10 or whether it is in the position shown in Figure 11 the meter actuating shaft on which the boss is mounted returns the boss so that the radial face 137 of the boss 136 is again in abutment with the vertical radial face 128 of the clutch corresponding to "up flag" position.

Quite frequently a passenger desires to have the cab carry him for an extended distance or beyond the normal intra-city range of the cab. Numerous taxicab companies permit their drivers to carry passengers on trips of this nature and ordinarily permit the cab driver to charge a per-mile fare somewhat different from that charged for intra-city service. In this event, the meter would indicate an incorrect amount of the fare to be charged and accounted for. I therefore provide mechanism for disconnecting the meter actuating shaft, and therefore the meter itself, and concurrently or simultaneously switching the system over to straight mileage or odometer basis. This odometer is a separate odometer from the one ordinarily installed in all cabs and since the special odometer is not intended to be used during the period when the taxi is merely cruising as distinguished from carrying a passenger, the special odometer reading will furnish a correct trip or chargeable mileage indicating to the taxicab checker in the event such checking is performed.

The special odometer is designated, as appears in Figure 1, by reference numeral 301 and is connected by the customary cable 302 to an odometer switch box 303, appearing in section in Figure 17, through a fitting 304. When the odometer is in engagement an input cable 306 taken off the customary odometer cable enters through a rear wall 307 of the odometer box 305 or housing, passing through an aperture 308 in the wall, the cable 306 being supported for rotation by a bearing 309 mounted within a bushing 311 fitting within the aperture 308. The odometer input line 306 leads forwardly through the bearing 309 and terminates at its innermost end in a collar 316, a sleeve 310 encompassing the line 306 and being fastened thereto by a pin 315. Upstanding from opposite sides of the sleeve 310 is a pair of triangular or wedge-shaped teeth 317, the teeth being rotatable with the input line 306 and sleeve 310. The input line 306, and the sleeve 312 encompassing the line, rotate in a direction as indicated by the arrow 321, the lower side of the tooth 317, as it appears in Figure 18, bearing against a corresponding pair of triangular teeth 326 projecting upwardly from a first flange 327, the result being that the first flange 327 is also carried and rotated in the direction shown by the arrow 321. It is to be noted that the tips of the teeth 317 do not come into contact with the roots of the teeth 326, thus causing the teeth to engage and run with relative quietness and lack of shock. Adjacent the first flange 327 is a second flange 328 spaced from the flange 327, both flanges projecting outwardly from a slidable sleeve 329 translatable on and substantially encompassing the output odometer cable 302, the output cable being supported by a suitable bearing 296 in an aperture 297 in the odometer front wall 298. In the position of the parts appearing in Figures 17 and 18 there is, therefore, a constant and direct flow of power from the input rod 306 directly through to the output rod 302 which, in turn, activates the indicia 311 appearing behind the window in the odometer indicator 301.

In the event the cab driver has completed his odometer fare and desires to return to ordinary meter readings, I provide a mechanism to enable him quickly and easily to disconnect the odometer and concurrently return the system to the meter type of reading. By pushing in the odometer clutch button 54 and the clutch rod 53, or toward the right, as it appears in Figure 17, a corresponding right-hand direction of motion is imparted to the lower end of the Y-shaped member 331 pivotally mounted on the rod 53 by a pivot pin 332, and which most clearly appears in Figure 19. The lowermost portion of the Y-shaped member 331 comprises a cross-bar 335 connected by a substantially parallel upstanding pair of arms 336, the arms diverging at a location slightly above the rod 53 to form a pair of upwardly and outwardly spreading members 337, the members 337 being bent inwardly adjacent their upper ends to form a pair of substantially parallel portions 338. Extending between the portions 338 is a horizontal rod 340 disposed at all times between the lowermost segments of the flanges 327 and 328. The uppermost extremities of the Y-shaped member 331 terminate in a V-shaped notch 341, each V-notch having a pair of ears 342 upstanding therefrom. Disposed within each of the notches 341, and at right angles to the arm portions 338, are the lower extremities 345 of a yoke 348 each having formed therein an inverted V-shaped notch 346, each of the notches 346 being straddled by a pair of depending ears 347. The yoke arms extend upwardly and curve arcuately inward to join adjacent the upper ends thereof. At the top of the yoke a projection 349 extends upwardly and fits through an aperture 351 in a strip 352 of springy material, the strip being fastened at each end to the tops of the front and rear walls by suitable fastenings 353. In all positions of the yoke, the springy strip 352 is under a condition of tension so that at all times the yoke is urged downwardly with the yoke notches 346 in interlocking engagement with the notches 341 in the Y-shaped member. The effect of the spring tension exerted on the Y-shaped member is to force the pivot pin 39 temporarily to remain in the position shown in Figure 17. Thus, as the clutch rod 53 is pushed toward the right, swinging the Y-shaped member ahead of it, the upper portions 338 of the Y-shaped member are rotated in a counterclockwise direction, about the pin 339 as a pivot. As the upper portions 338 of the Y-shaped member are rotated counterclockwise, the ear 342 moves toward the left and away from a limit spring 361 or buffer. The limit spring 361 is of a resilient material and serves to act as a buffer when the Y-shaped member is snapped into abutment therewith and serves as well to position the Y-shaped member in proper location. The buffer spring 361 is connected to the odometer electrical switch 52 and by suitable spring mechanism (not shown) is urged in a counterclockwise direction in Figure 17. As the ear 342 of the Y-shaped member moves away from the buffer spring 361, the spring 361 moves in a counterclockwise direction and allows the switch 52 to close. As the rod 53 continues to be pushed toward the right and the lowermost portion of the Y-shaped member likewise is carried toward the right, a position is soon reached in which the pin 332 is substantially vertically below the pin 339. Slight motion beyond this point of the pin 332 quickly shifts the moment of force on the Y-shaped member 331 and the yoke 348 under spring force is then able to snap the upper portion of the Y-shaped member 331 sharply toward the left. It will be recognized that as the rod 53 is pushed toward the right the pin 339 is pushed upwardly into the space between the flanges 327 and 328 and the further upward the pin 339 travels the greater will be the force exerted on the yoke 348 and the greater will be the distortion of the springy strip 352. Thus, as the overbalancing point is reached the spring 352 is under very substantial tension and very suddenly snaps the upper portion of the Y-shaped member, including the pin 339, toward the left. As the pin 339 is snapped toward the left it abuts against the adjacent face of the flange 328 and likewise snaps that flange and its attendant mechanism toward the left, the collar 329 translating along the shaft 302, the collar 329 being provided with an oppositely disposed pair of slots 366 straddling a projecting through pin 367 in the shaft 302 to prevent collar rotation. With the collar 329 in a position to the left of that shown in Figures 17 and 18, the theretofore meshing teeth 317 and 326 are no longer in engagement; thus the rotation of the input odometer rod 306 is no longer communicated to the output rod 302 and the odometer ceases to register. Simultaneously, as explained above, the electrical switch 52 is thrown into its closed position and the taximeter control device of my invention is then in a condition again to start the meter.

A somewhat similar series of events occur in the reverse sequence where the odometer clutch rod 53 is pulled outwardly to disconnect the meter system and to connect the odometer system. A similar, although reversed, snapping of the collar 329 and the attendant flanges 327 and 328 are effected to accomplish reengagement of the pairs of teeth 317 and 326; concurrently the buffer strip 361 is abutted by the adjacent ear 342 and forced to the right against the urgency of an interior spring (not shown) in the switch 52, thereby opening the switch 52 and disconnecting the meter system.

While the input odometer rod 306 continues to rotate at all times there is no harmful shock incurred by the output rod 302 and its attached mechanism at the instant of re-engagement since the output structure is very light in weight and thus provides but little inertia effect. Thus, upon engagement of the teeth, the output rod is very quickly brought up to input speed. Further protection is ordinarily inherent in the construction of the usual odometer line by the provision for example of a helical coil able to absorb such energy as is imparted to it. Such energy absorption devices are well known in the odometer art and it is felt that no additional mention need be made of that feature.

Figure 12 illustrates a taximeter of a type commonly used but differing in some respects from the type of meter illustrated in Figure 1. In the kind of meter shown in Figure 12 no crank is involved and the flag and the attendant flag shaft is customarily placed on the front or window side of the meter as illustrated. In the type of meter shown in Figure 12 the rotation of the flag shaft is transmitted along a transverse shaft 402 having a worm 403 mounted thereon in engagement with a corresponding gear 404 secured to a longitudinal meter shaft 405, the shaft 405 serving to start the operation of the meter and resembles structurally and in purpose the meter shaft 102 illustrated in outline in Figure 4. Thus, appropriate rotation of the shaft 405 by electrical energization of a solenoid produces a similar result to that encountered in the first type of meter described and can therefore be suitably rotated by the mechanism heretofore described and appearing in the box 152. As described above, the box 152 is disconnectable from the box 151 since the meter actuating shaft 142, as appears in Figure 4, can easily be disconnected from the adapted shaft 131 in the box 151 by unfastening the box 151 from the box 152 and shifting the box 151 outwardly and away from the box 152. Upon original manufacture of the box 152 and its contents, or upon separation of the boxes in the manner above described, the box 152 can be attached substantially as shown in Figure 12 to one end of the meter 401. In the position shown in Figure 12, the electromechanical system contained within the box 152 acts in a manner substantially similar to that described above and shown in Figures 4 and 5 and by appropriate energization of the solenoid the upstanding dog 183 is forced against the depending finger 182, thereby rotating the meter actuating shaft which in the case of the meter shown in Figure 12 is designated by the numeral 406. As the meter actuating shaft 406 and meter shaft 405 are rotated by translation of the plunger through their predetermined arcs, such as 60 degrees, the interior electrical circuit is broken since the contacts 61 and 62 are no longer in electrical communication owing to the interposition of the non-conducting sector 58 (most clearly shown in Figure 7). As the circuit is broken, the plunger is returned by spring urgency to its normal position as described above.

A distinguishing feature of the meter appearing in Figure 12 is that the meter is stopped and reset to zero by rotation of the flag 400 onwardly through a 360 degree arc, as shown by the arrow 411. Since rotation of the flag 400 causes a coresponding substantial rotation of the meter actuating shaft 406, the depending finger 182 (see Figure 5) is rotated similarly through a 360 degree arc. In the view appearing in Figure 5, as the depending finger 182 is rotated through a 360 degree arc in a counterclockwise direction it will be seen that the depending finger will be driven into abutment with the upstanding dog 183. Since, however, the dog 183 can yield in a clockwise direction by compression of the spring 193, the depending finger 182 can continue its full rotational movement and terminate at the position indicated in Figure 5 and which corresponds again to a vertical position of the flag shaft bearing the flag 400.

While the box 152 is interchangeable as between the two kinds of meters, the structure appearing in box 151 can be used only on the type of meter shown in Figure 1 and not on the meter illustrated in Figure 12. It is therefore necessary to provide a modified form of flag shaft and clutch construction to enable the cab driver manually to place his meter in operation in the event he chooses to employ manual type of operation. The flag 400 is mounted on a flag shaft 421 secured at its lower end to a sleeve 422 entering an aperture 423 in the front end 424 of the box 426 and as appears most clearly in Figure 13. The sleeve 422 is secured to a stub shaft 431 by a pin 432, the inner end of the stub shaft being enlarged to form a flange 433, the flange being symmetrical about an axis 434, said axis also being coaxial with the cross or transverse shaft 402 inside the meter box. Parallel to the axis 434 but spaced radially outward therefrom is a plurality, preferably four, of through holes 436 passing through the flange from the flange's outer end 437 to its inner end 438. Capping the outer end 437 of the flange and secured thereto as by fastening 441 is a washer 442 also serving to confine springs 443 disposed in the through holes and urging inwardly in each through hole a corresponding ball 446, such as a steel ball. The innermost surfaces 451 of the balls fit within corresponding arcuate grooves 452 formed radially in a collar 453, the collar being screwed into a sleeve 454, the outermost end of the sleeve being downturned as at 455 to cover and restrain against translation an outturned ring 456 at the innermost end of the flange 433.

As the shaft 422 is rotated, the flange 433 is correspondingly rotated. Owing to the pressure of the springs 443, forcing the balls 446 into their corresponding grooves 452, however, considerable extra pressure must be exerted on the shaft 422 since sufficient force must be transmitted to the balls to cam them out of their grooves 452 and force the balls upwardly onto plateaus 461 extending arcuately between the grooves. As the shaft and attendant flange 433, as well as the balls, are rotated through approximately a 90 degree arc, the balls are again in registry with the grooves and under spring urgency are forced inwardly into the grooves. Should it be desired to rotate the shaft another 90 degrees, enough force will have to be exerted again to cam the balls out of their corresponding grooves and ride upwardly onto the plateaus 461 extending arcuately between the grooves. At the end of approximately 180 degrees of rotation, the balls will again match with their corresponding grooves and be forced inwardly. In this fashion the shaft can be rotated through 270 thence through 360 degrees; but owing to the ball and groove construction the shaft can be held in relative security at locations 90 degrees apart. This construction is made necessary owing to the fact that meters of the type shown in Figure 12 depend upon flag shaft rotation in discrete arcuate intervals of 90 degrees in order fully to realize the capabilities of the meter.

It is to be noted that as the shaft 422 and flange 433 are rotated, along with the attendant ball structure, a similar rotation is not transmitted by the balls to the grooved collar 453 and its threadedly engaged sleeve 454 nor to the cross shaft 402. I therefore provide mechanism for appropriate rotation of that shaft. The meter cross shaft 402 projects outwardly from the front side 471 of the meter through a first supporting housing 470 and second housing 472, the collar 453 being secured to the second housing 472 as by a set screw 473. The cross shaft 402 terminates in a stub axle 474. The stub axle 474 is the portion of the shaft 402 to which the flag of the meter in its original location was connected, the flag having been removed at the time the control device was installed on the meter. Encompassing the axle 474 and secured thereto by a through pin 476 is a sleeve 477 having on its innermost end an annular projection 478, the annulus comprising, however, only one half of an entire or circular ring. In the position shown in Figures 13 and 14, the half-annulus 478 has an upper radially and vertically disposed face 481 and a lower radially and vertically disposed face 482. Bearing against the upper face 481 is a corresponding vertical radially disposed face 486. The radial face 486 is separated from a corresponding but horizontally disposed radial face 487 displaced 90 degrees from the face 486, the two faces being the ends of an approximately one quarter annular ring or arcuate shaped projection 488 formed on and extending outwardly from the inner end of the flange 433. When the flag shaft and attached flange 433 are rotated in a clockwise direction, as appears in Figures 12 and 14, the face 486 on the quarter annulus 488 bears or urges against the adjacent face 481 on the half annulus 478 mounted on the axle shaft 474 and rotates the shaft 474 in a clockwise direction by a corresponding amount. The shaft 474, being an integral part of the meter cross shaft 402, therefore causes the meter cross shaft 402 to rotate a similar amount and with adequate rotation, for example, in excess of 30 degrees, thus places the meter in operating status. In the event the cab driver chooses manually to work his meter, he can by rotating his flag shaft in an appropriate direction rotate the projection 488 which urges ahead of it and similarly rotates the main meter cross shaft 402, first into operating position and then at the conclusion of the trip into stopping and reset position, with the flag rotated through 360 degrees into its customary vertical attitude.

As in the case of the first meter described I provide structure for preventing rotation of the flag in an incorrect direction. A through hole or slot 501 is bored in the outer margin of the flange 433, as appears most clearly in Figure 15, and in the slot is disposed a pin 502 urged inwardly by a spring 503 confined by the washer 442, the inner end of the pin 502 moving in a circular path defined by an annular slot 506 or groove formed in the outer end of the collar 453. Disposed in the left-hand portion of the annular groove 506, as shown in Figure 14, and covering an arc thereof of approximately 80 degrees is an arcuately formed ring 511, secured in the ring by a pin 512, and having a flat outermost face 513 and a sloping face 514 on the side adjacent the location of the balls to permit ball clearance as the balls are rotated. At the lowermost end of the ring 511, and as most clearly appears in Figure 14, the ring is tapered from the face 513 to the bottom of the slot 506 and forming a cam face 516. The cam face 516 allows the pin 502 to ride upwardly along the cam face onto the flat outermost portion 513 as the flange 433 and the pin 502 are rotated clockwise, and to drop off suddenly just beyond the upper end of the ring and back into the circular groove 506. Thus, the ring offers no significant resistance to rotation of the pin 502 as the pin 502 is carried around in a clockwise direction by clockwise rotation of the flange 433. In a position prior to the start of the meter, the pin 502 is substantially in the location shown in Figure 14 and since the uppermost end of the ring is not sloping but imposes a sheer wall it is obvious that the pin 502 will abut the upper end wall of the ring and prevent counterclockwise rotation of the pin 502 and thus prevent counterclockwise rotation of the flange 433 and the attendant flag and flag shaft. The pin and ring mechanism thus serves a function quite similar to that performed by the pin 176 shown in Figures 4 and 6 with respect to the type of meter appearing in Figure 1.

As stated above, the type of meter shown in Figure 12 can in addition to manual operation also be started electro-mechanically as a result of the operation of the solenoid or equivalent mechanism contained in the box 152. If, for example, all of the switches are closed and the solenoid energized, the shafts 406 and 405 will be rotated through an appropriate arc, thus setting the meter in operation. Owing to the interconnection of the worm and gear 403 and 404, rotation of the shaft 405 causes a corresponding rotation of the cross shaft 402. As the cross shaft 402 rotates, the half annular ring 478 is similarly rotated and as appears most clearly in Figure 14, as the annular ring 478 is rotated, for example, in a clockwise direction, separation of the face 481 on the half annulus from the face 486 on the quarter annulus will be effected. At the conclusion of the operation of the solenoid, the angles subtended between the faces 478 and 486, for example, might be of the order of 60 degrees. If the cab driver were so inclined an attempt might be made by him to return the ring 478 to its starting position so as to stop the meter and would attempt to accomplish this by rotating the flag in a counterclockwise direction so that the face 487 of the quarter annulus will impinge upon the face 482 of the half annulus and rotate the face 482 and the half annular ring 478 back to the position as shown in Figure 14. As explained above, however, the pin 502 upon abutment with the upper end wall of the ring 511 would prevent any counterclockwise motion of the flag shaft and the driver would therefore be unable to return the meter to "high flagging" position.

At the conclusion of the run the meter may be stopped in the customary manner (as the passenger departs and the gear shift lever is put in neutral) and placed again in reset position by rotating the flag shaft through 360 degrees. It is to be especially noted that stopping and resetting of the meter cannot be accomplished, however, so long as a passenger is sitting in one of the seats, so that one of the seat switches is closed. If, for example, the cab driver were to attempt to rotate the flag shaft through 360 degrees to "high flagging" position while the passenger was still in the car, and so long as the car gear shift lever was in operating position, thus closing the switch 44, the electro-mechanical portion of the meter would again immediately become operative and re-activate the meter. It can thus be seen that in both forms of the taximeter control device of my invention a mechanism has been provided which is substantially foolproof and which makes relatively unimportant any negligent or dishonest practices on the part of a cab driver, and as a consequence, substantially enhances the accountable and thus collectable fares for the benefit of operators of taxicab companies employing the control device of my invention.

What is claimed is:

1. An automatic taximeter control comprising a meter actuating shaft, a tooth mounted on said shaft for rotation therewith and projecting substantially radially outwardly therefrom, an elongated plunger spaced from said shaft and mounted for reciprocable translation along its longitudinal axis said axis being substantially normal to the axis of rotation of said meter actuating shaft, a finger pivotally mounted on said plunger adjacent one end of said plunger and movable therewith from a first position spaced from said tooth to a second position in engagement with said tooth for rotation thereof through a predetermined arc to a third position, an armature mounted at the other end of said plunger and translatable therewith, an electromagnet disposed adjacent the free end of said armature, said electromagnet having an interior cavity to receive said armature upon translation thereof in response to energization of said electromagnet, an electrical energy source, an electrical circuit connected with said energy source and containing said electromagnet in series connection therewith, a plurality of occupant-activated switches within said circuit, a gear shift lever activated switch within said circuit, and means for connecting said meter actuating shaft with a taximeter shaft to rotate said taximeter shaft upon closure of at least one of said occupant-activated switches and said gear shift lever actuated switch.

2. An attachment for a taximeter having a fare recording mechanism and an odometer, said attachment comprising a first housing mounted on said taximeter and interposed between the meter shaft and the flag shaft of said taximeter, a meter actuating shaft in said first housing one end of said actuating shaft being connected to the meter shaft and the other end being clutchably connected to the flag shaft, switch-responsive means in said first housing for rotating said actuating shaft and said drive shaft whereby said fare recording mechanism is rendered operative, said attachment further comprising a second housing mounted adjacent said taximeter, an odometer input cable journaled in said second housing, an odometer output cable journaled in said second housing in substantial alignment with said input cable, and means for concurrently clutching together said input and said output cable and rendering inoperative said switch-responsive shaft rotating means.

3. An attachment to a taximeter having a housing and a meter shaft adapted to rotate at least through a predetermined arc to actuate the fare recording mechanism within said taximeter housing, said attachment comprising an elongated box mountable on a side of said taximeter housing, a shaft extending transversely across said box and journaled in the opposite walls thereof, said shaft being connectable to the adjacent end of said meter shaft and in alignment therewith, a radial projection on said shaft, a plunger translatably mounted in said box at right angles to said shaft, means on said plunger for engaging said radial projection in one direction of translation of said plunger, means mounted on said box for translating said plunger from a base position and in said one direction an extent sufficient to rotate said shaft and said meter shaft through said predetermined arc, means for rendering inoperative said plunger translating means as said rotation through said predetermined arc is completed, and means for returning said plunger to base position.

References Cited in the file of this patent

UNITED STATES PATENTS

| | | |
|---|---|---|
| 1,529,889 | Hoffman et al. | Mar. 17, 1925 |
| 1,541,543 | Weiss | June 9, 1925 |
| 1,604,042 | Handler | Oct. 19, 1926 |
| 1,850,740 | Brownell | Mar. 22, 1932 |
| 1,993,428 | Abrell et al. | Mar. 5, 1935 |
| 2,001,373 | Weiss | May 14, 1935 |
| 2,015,961 | Pierce | Oct. 1, 1935 |
| 2,650,757 | Weisinger | Sept. 1, 1953 |